United States Patent
Yao et al.

(10) Patent No.: US 11,871,274 B2
(45) Date of Patent: Jan. 9, 2024

(54) PERFORMANCE MEASUREMENTS AND KPIS RELATED TO PACKET DELAY IN NG-RAN AND 5GS

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

(*) Notice: Subject to any disclaimer, the term of this patent is extended or adjusted under 35 U.S.C. 154(b) by 159 days.

(21) Appl. No.: 17/238,418

(22) Filed: Apr. 23, 2021

(65) Prior Publication Data

US 2021/0243652 A1    Aug. 5, 2021

Related U.S. Application Data

(60) Provisional application No. 63/023,740, filed on May 12, 2020, provisional application No. 63/019,761, filed on May 4, 2020.

(51) Int. Cl.
*H04W 28/08* (2023.01)
*H04W 76/12* (2018.01)
(Continued)

(52) U.S. Cl.
CPC ....... *H04W 28/0975* (2020.05); *H04W 48/18* (2013.01); *H04W 76/12* (2018.02); *H04W 80/02* (2013.01); *H04W 92/10* (2013.01)

(58) Field of Classification Search
CPC . H04W 28/0975; H04W 48/18; H04W 76/12; H04W 80/02; H04W 92/10; H04W 88/085; H04W 88/18; H04W 24/04
See application file for complete search history.

(56) References Cited

U.S. PATENT DOCUMENTS

2020/0059324 A1* 2/2020 Martin ............... H04L 1/187
2020/0229049 A1* 7/2020 Wu ..................... H04W 88/085
(Continued)

OTHER PUBLICATIONS

"3GPP TR 21.905 V17.0.0 (Jul. 2020)", 3rd Generation Partnership Project;Technical Specification Group Services and System Aspects;Vocabulary for 3GPP Specifications(Release 17), (Jul. 2020), 12 pgs.

(Continued)

*Primary Examiner* — Kan Yuen
(74) *Attorney, Agent, or Firm* — Schwegman Lundberg & Woessner, P.A.

(57) ABSTRACT

An apparatus and system for generating KPIs based on packet delay performance measurements through a NG-RAN or 5GC are described. Integrated average UL and DL delays in NG-RAN, gNB DU delays and e2e delays are determined for each sub-network, network slice subnet, and network slice, and for a gNB DU. An overall NR cell DU delay including air interface delay and delay within the NR cell DU, and an overall gNB-CU delay including F1 interface delay and delay within the gNB-CU-UP, are each independently weighted for each gNB and in each direction for the integrated delay KPI in the NG-RAN. The e2e delay KPIs are average UL or DL delays between a UPF and UE(s) for a network slice based on e2e delays for each N-3 and N9 interface weighted by number of packets or data volume of the interface for the corresponding direction.

18 Claims, 9 Drawing Sheets

(51) Int. Cl.
*H04W 80/02* (2009.01)
*H04W 48/18* (2009.01)
*H04W 92/10* (2009.01)

(56) References Cited

U.S. PATENT DOCUMENTS

| | | | |
|---|---|---|---|
| 2021/0014737 A1* | 1/2021 | Yang | H04W 76/11 |
| 2021/0058302 A1* | 2/2021 | Marquezan | H04L 41/5009 |
| 2021/0274366 A1* | 9/2021 | Yao | H04L 43/0852 |
| 2021/0320878 A1* | 10/2021 | Young | H04L 47/808 |
| 2022/0141751 A1* | 5/2022 | Yao | H04W 36/32 370/331 |
| 2022/0312275 A1* | 9/2022 | Van Phan | H04L 43/50 |
| 2023/0007520 A1* | 1/2023 | Yao | H04L 43/0817 |
| 2023/0129773 A1* | 4/2023 | Arnold | H04W 24/08 709/224 |

OTHER PUBLICATIONS

"ETSI TS 132 401 V15.0.0", Digital cellular telecommunications system (Phase 2+) (GSM);Universal Mobile Telecommunications System (UMTS);LTE;Telecommunication management;Performance Management (PM);Concept and requirements(3GPP TS 32.401 version 15.0.0 Release 15), (Jul. 2018), 30 pgs.

"ETSI TS 132 404 V15.0.0", Digital cellular telecommunications system (Phase 2+) (GSM); Universal Mobile Telecommunications System (UMTS); LTE;Telecommunication management;Performance Management (PM);(3GPP TS 32.404 version 15.0.0 Release 15), (Jun. 2018), 32 pgs.

"3GPP TS 23.501 V16.4.0", 3rd Generation Partnership Project;Technical Specification Group Services and System Aspects;System architecture for the 5G System (5GS);Stage 2(Release 16), (Mar. 2020), 430 pgs.

* cited by examiner

PERFORMANCE MEASUREMENTS AND KPIS RELATED TO PACKET DELAY IN NG-RAN AND 5GS

PRIORITY CLAIM

This application claims the benefit of priority under 35 U.S.C. 119(e) to U.S. Provisional Patent Application Ser. No. 63/019,761, filed May 4, 2020, and U.S. Provisional Patent Application Ser. No. 63/023,740, filed May 12, 2020, each of which is incorporated herein by reference in its entirety.

TECHNICAL FIELD

Embodiments pertain to wireless communications in $5^{th}$ generation (5G), or new radio (NR), systems. Some embodiments related to performance measurements (PMs) and key performance indicators (KPIs) related to packet delay in next generation (NG) radio access networks (NG-RANs) and in $5^{th}$ generation (5G) system.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/$5^{th}$ generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted fix, those of other embodiments. Embodiments set forth in the claims encompass all available equivalents of those claims.

Figure 1A:
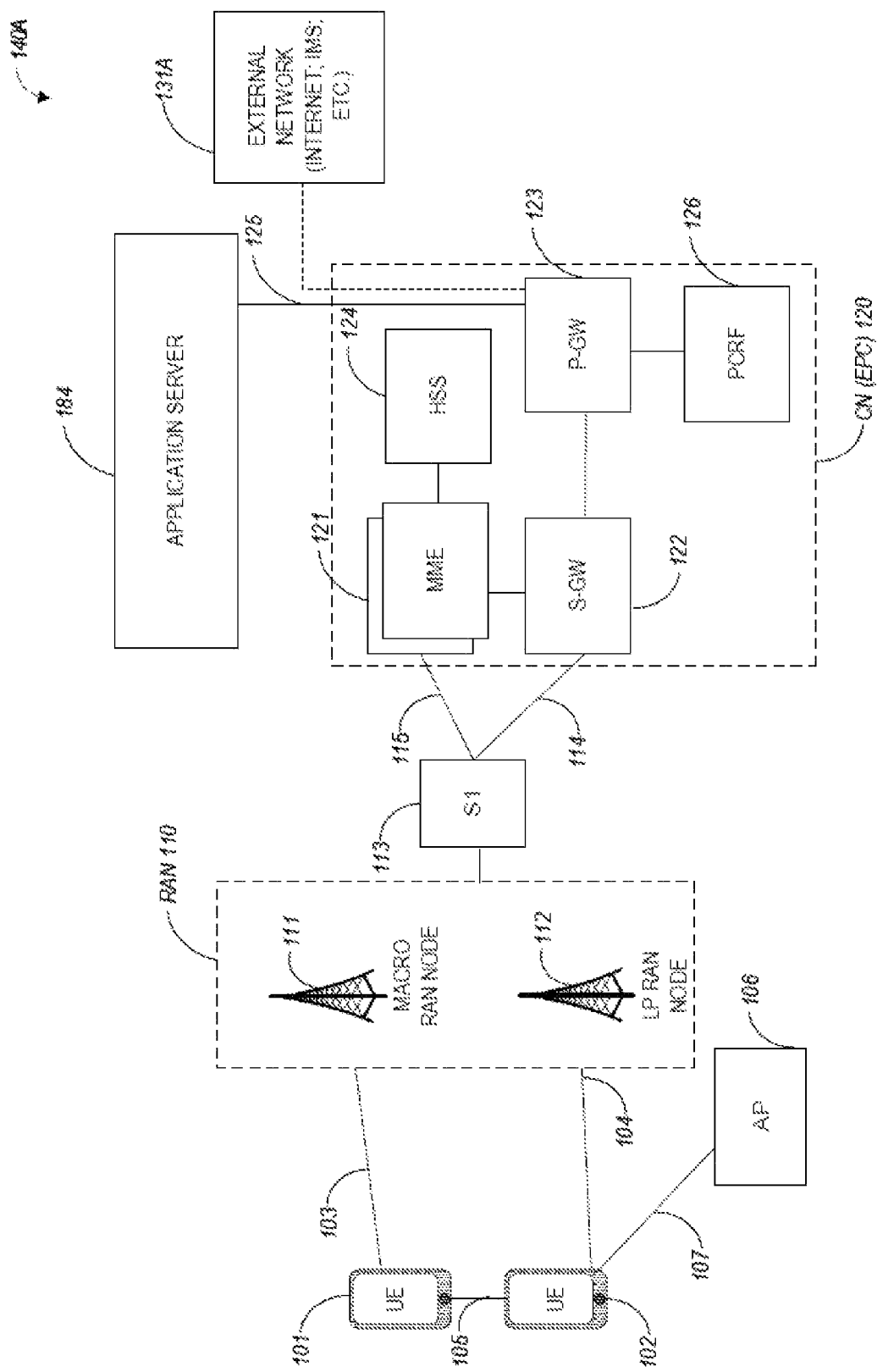
FIG. 1A illustrates an architecture of a network, in accordance with some aspects.

FIG. 1A illustrates an architecture of a network in accordance with sonic aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GEL, 3.4-3.6 GHz, 3.6-3.8 GHz, and other frequencies and Spectrum Access System (SAS) in 3.55-3,7 GHz. and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network, In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
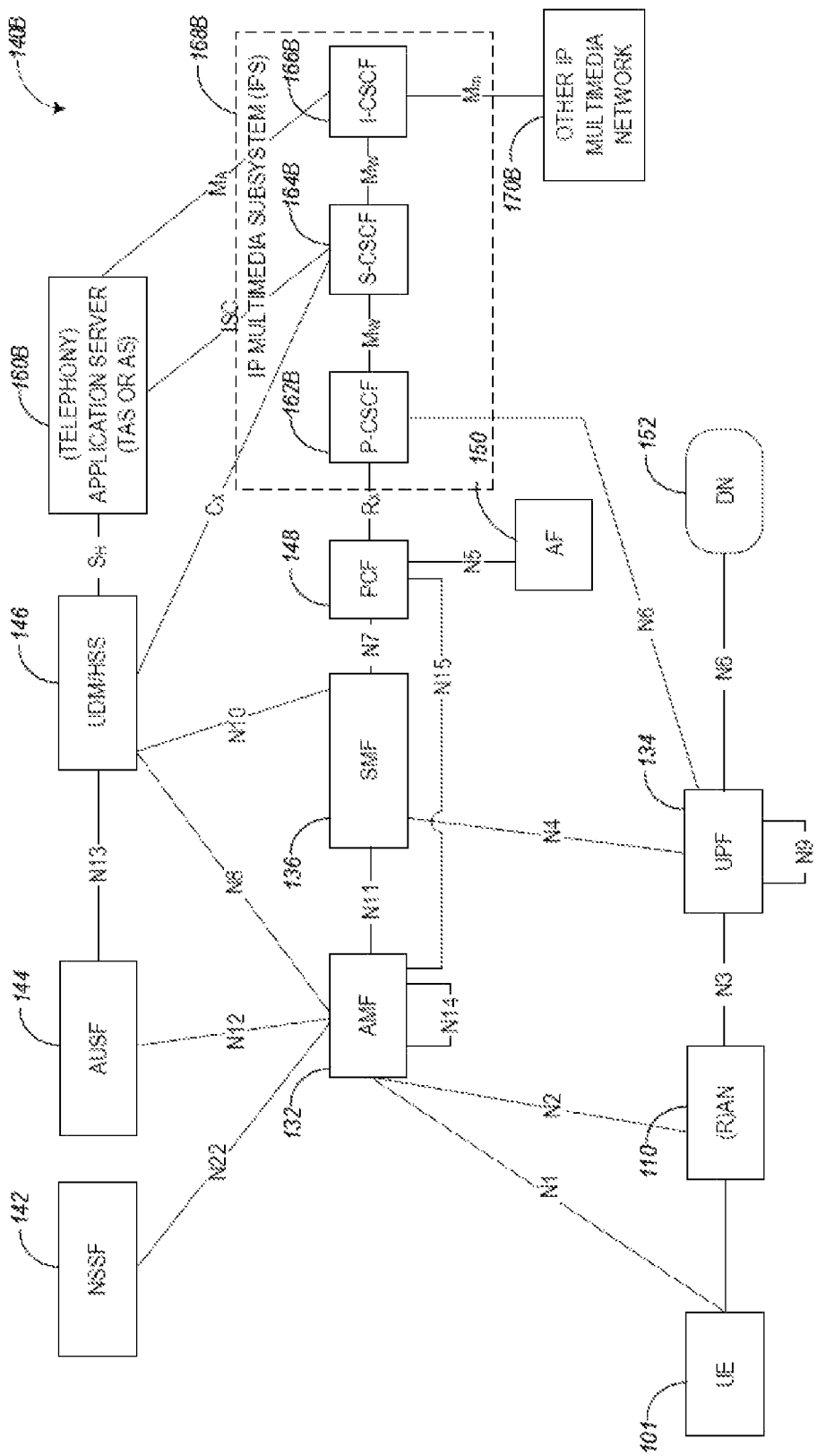
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically, UE 102 can be in communication with RAN 110 as well as one or more other 5GC network entities. The 5G system architecture NOB includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140E includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point/interface representation shows that interaction can exist between corresponding NF services. For example, FIG. 1B illustrates the following reference points/interfaces: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150), N6 (between the UPF 134 and the DN 152), N7 (between the SMF 136 and the PCF 148), N8 (between the UDM 146 and the AMF 132), N9 (between two UPFs 134), N10 (between the UDM 146 and the SMF 136), N11 (between the AMF 132 and the SMF 136), N12 (between the AUSF 144 and the AMF 132), N13 (between the AUSF 144 and the UDM 146), N14 (between two AMFs 132), N15 (between the PCF 148 and the AMF 132 in case of a non-roaming scenario, or between the PCF 148 and a visited network and AMF 132 in case of a roaming scenario), N16 (between two SMFs, not shown), and N22 (between AMF 132 and NSSF 142). Other reference point representations not shown in FIG. 1E can also be used.

Figure 1C:
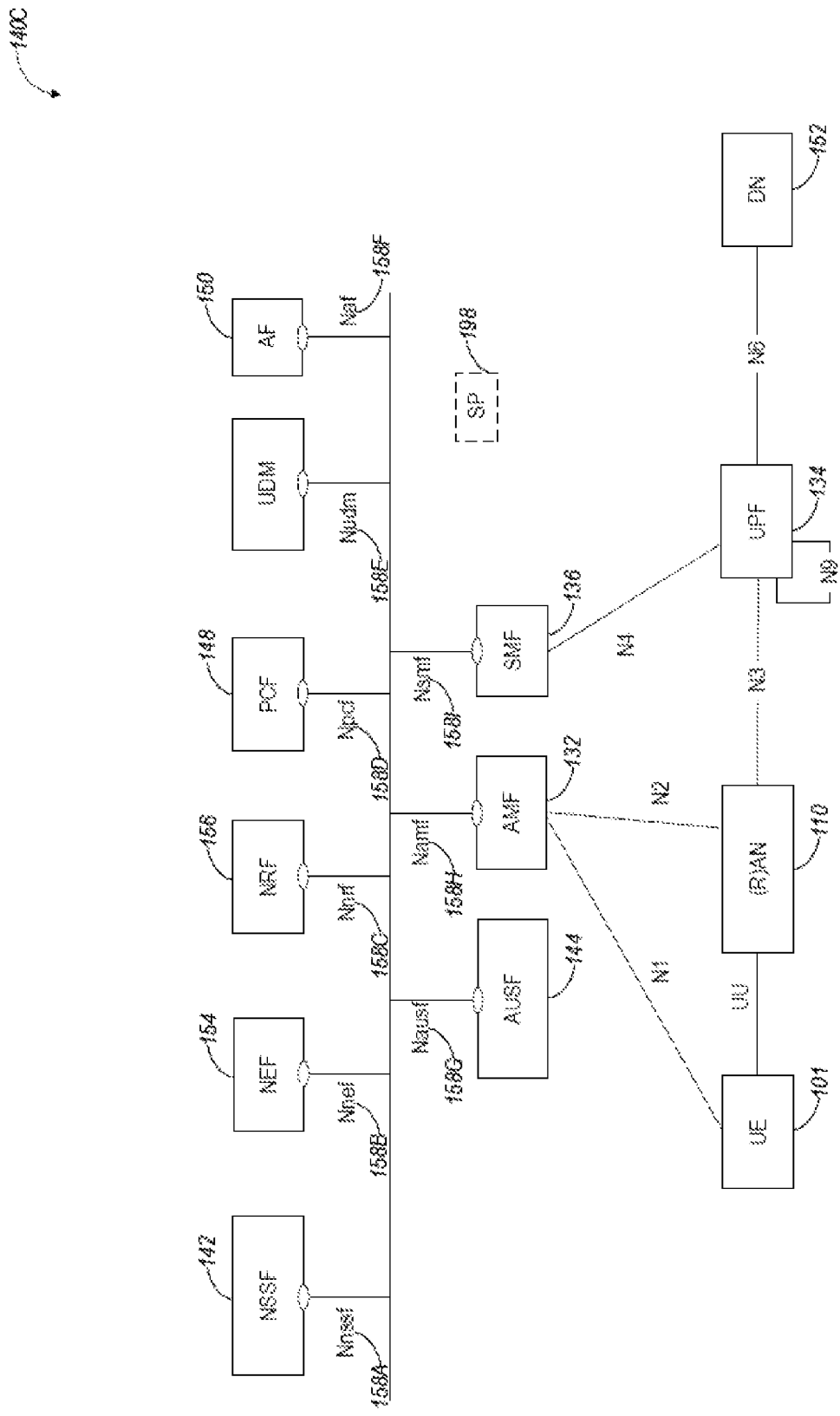
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces, In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136). Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 1D:
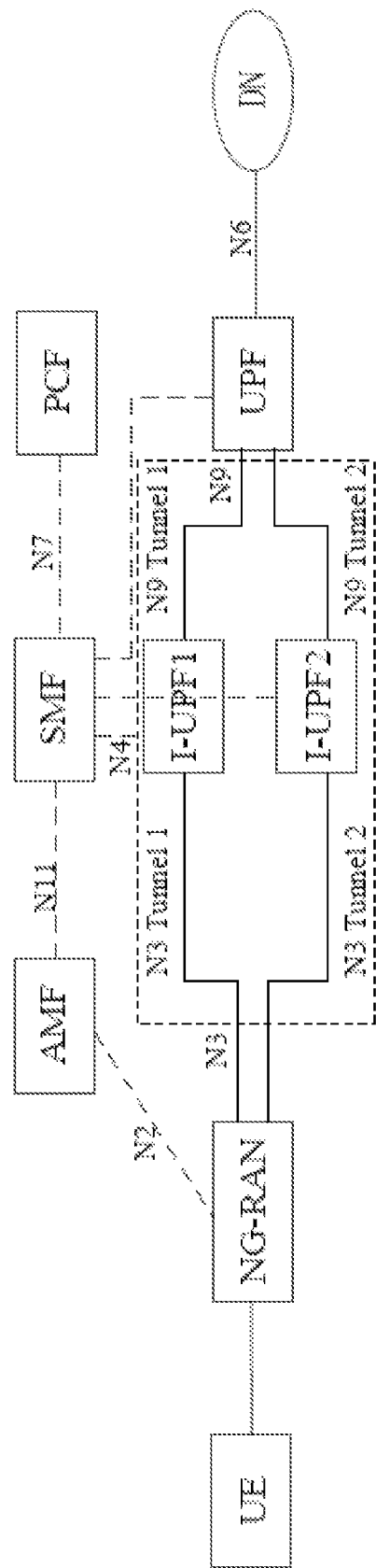
FIG. 1D illustrates a non-roaming 5G system architecture in accordance with some aspects.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems, FIG. 1D illustrates a non-roaming 5G system architecture in accordance with some aspects. FIG. 1D illustrates a user plane in a 5G system, showing multiple intermediate UPFs (I-UPFs) between the RAN 110 and the UPF 134, as well as the associated N3 and N9 interfaces.

Figure 2:
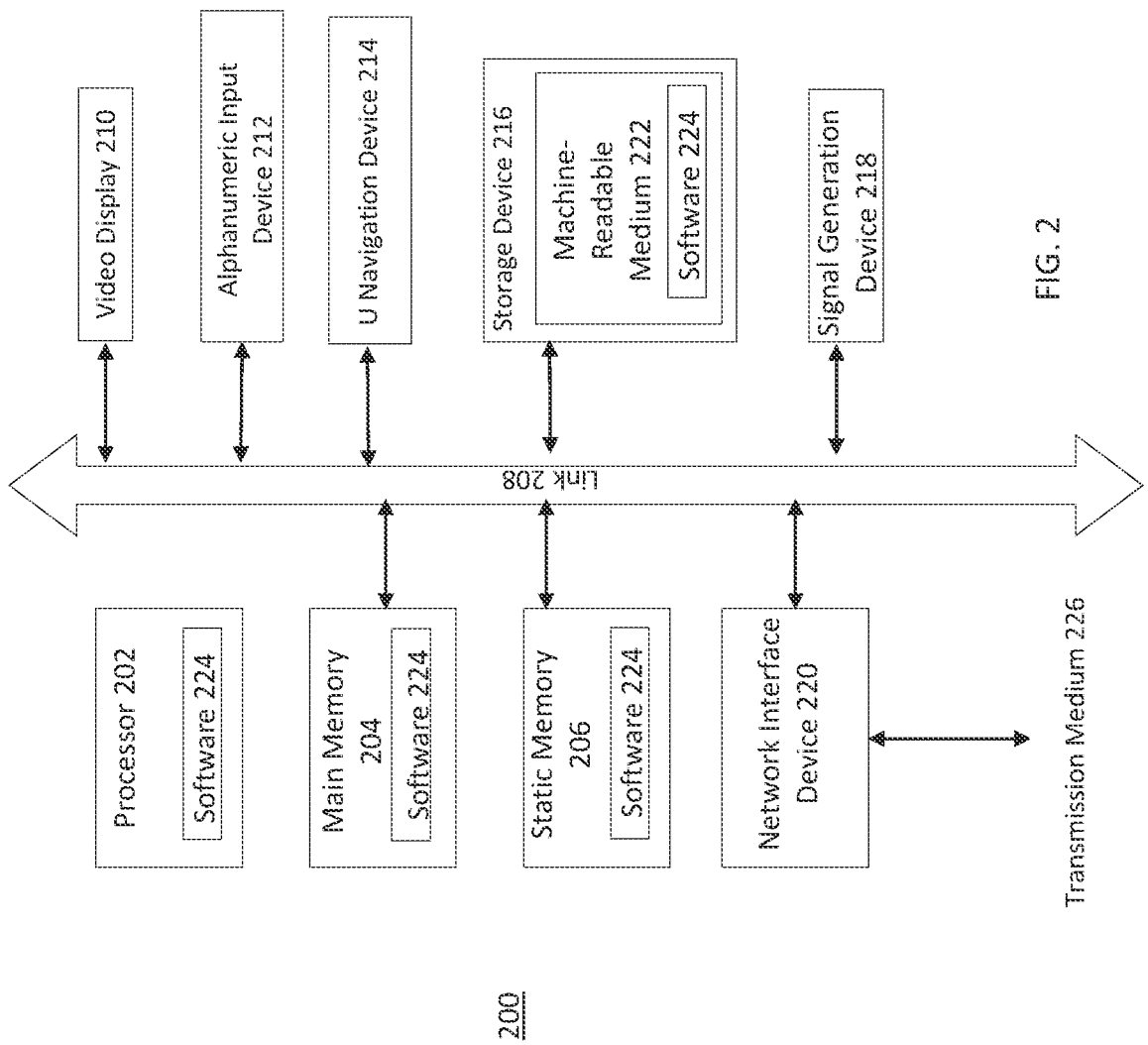
FIG. 2 illustrates a block diagram of a communication device in accordance with some embodiments.

FIG. 2 illustrates a block diagram of a communication device in accordance with some embodiments. The communication device 200 may be a UE, such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Nonlimiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/$5^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As above, one of the issues in a 5G network is the packet delay. The DL/UL packet delay between the NG-PAN and the UE (including the delay at the gNB central unit user plane (gNB-CU-UP), on the F1-U interface and on the gNB distributed unit (gNB DU) and the delay over the Uu interface) is one significant part of the e2e delay that has impact to users' experience for some types of services (e.g., Ultra-reliable low-latency communication (URLLC)).

In an NG-RAN, the user data traffic is transmitted from/to UEs via the NR cell through the gNB-DU. The user data volume of the NR cells in the gNB-DU is helpful for operators to understand the traffic distribution of the NG-RAN, and conduct capacity planning and optimization (e.g., expansion) of the NR cells in the gNB-DU. Therefore, the user data volume of the NR cells in the gNB-DU may be monitored. The user data number of user plane radio link control (RLC) service data unit (SDU) packets of the NR cells in the gNB-DU is relevant to the packet processing that result in larger or smaller packet delay. Therefore, the number of user plane RLC SDU packets sent/received by the NR cells in the gNB-DU may also be monitored.

Figure 3:
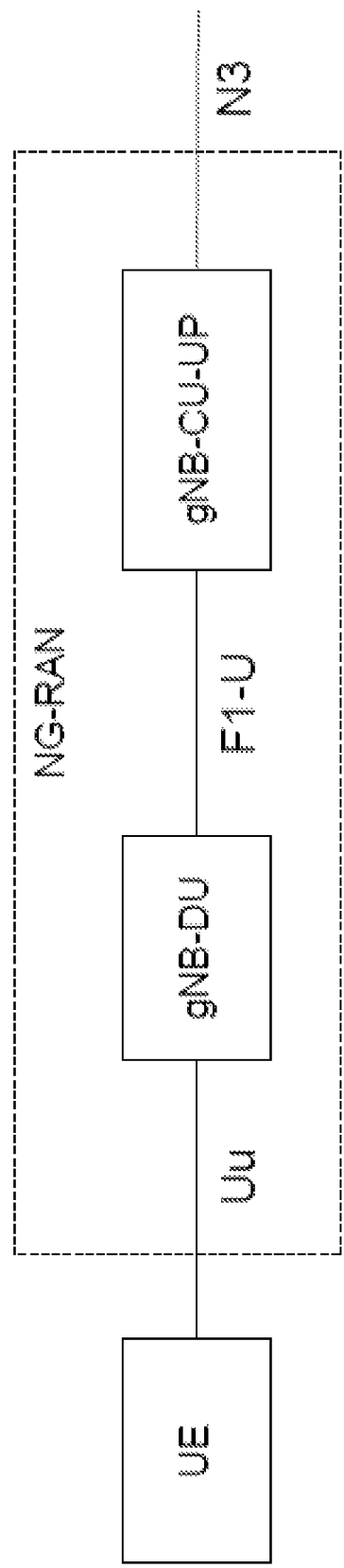
FIG. 3 illustrates user plane packet delay in accordance with some embodiments.

Generation of performance measurements, key performance indicators (KPIs) and measurements related to user plane RLC SDU data volume and number of user plane RLC SDU packets for a NR cell may permit adjustment of network resources to enhance user experience by, e.g., reducing latency (the measured delay) and/or packet loss, improving connectivity, providing gNB (or other network device) load balancing, etc. . . . In some embodiments, the service producer may indicate or perform the adjustment. In other embodiments, the adjustment may be performed by other network devices. FIG. 3 illustrates user plane packet delay in accordance with some embodiments.

Figure 4:
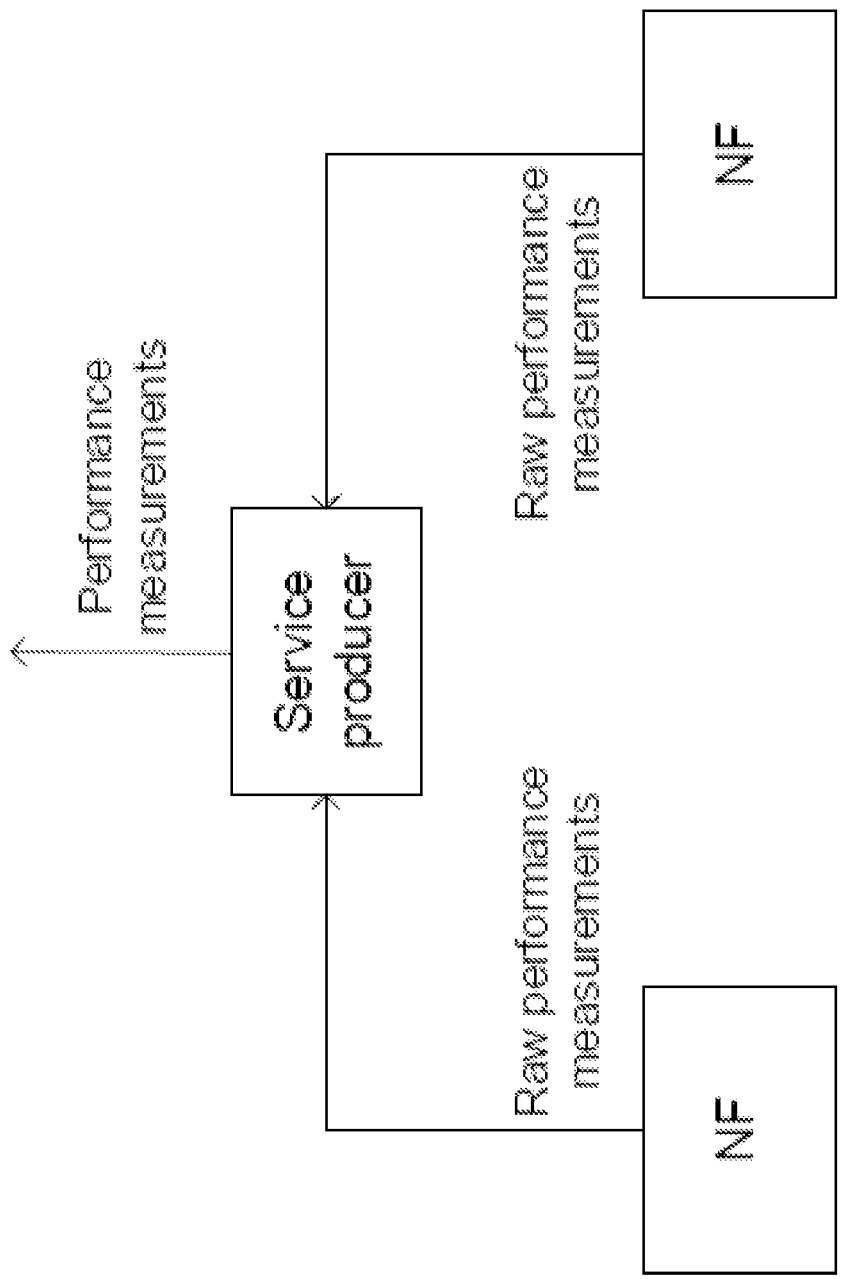
FIG. 4 illustrates network slice performance measurement generation in accordance with some embodiments.
Figure 5B:
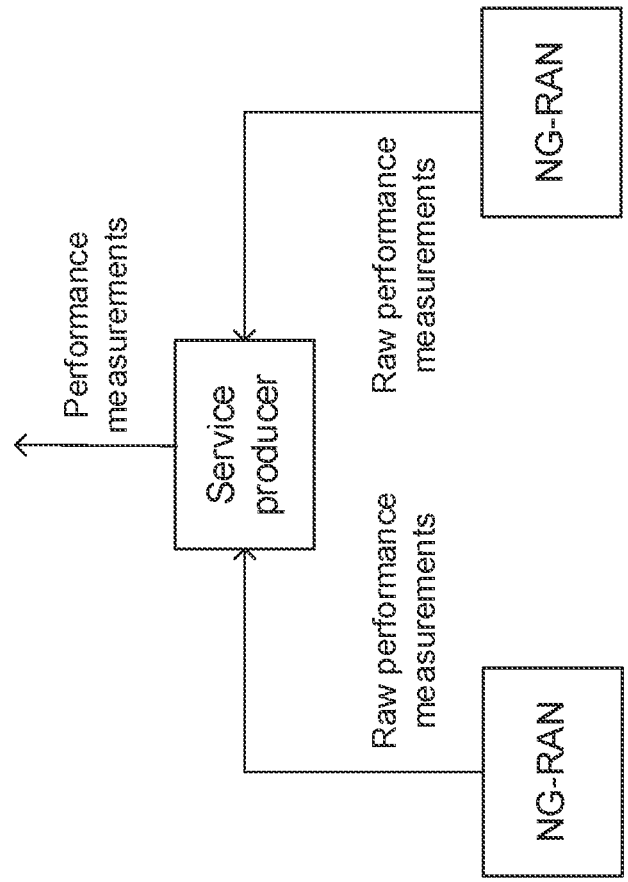
FIG. 5B illustrates network slice performance measurement generation in accordance with some embodiments.
Figure 5A:
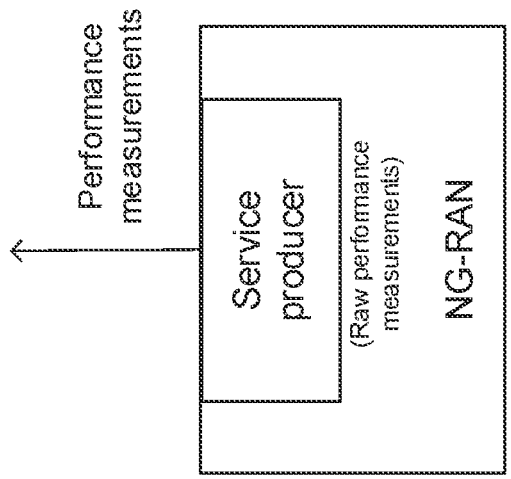
FIG. 5A illustrates network slice performance measurement generation in accordance with some embodiments.
Figure 6:
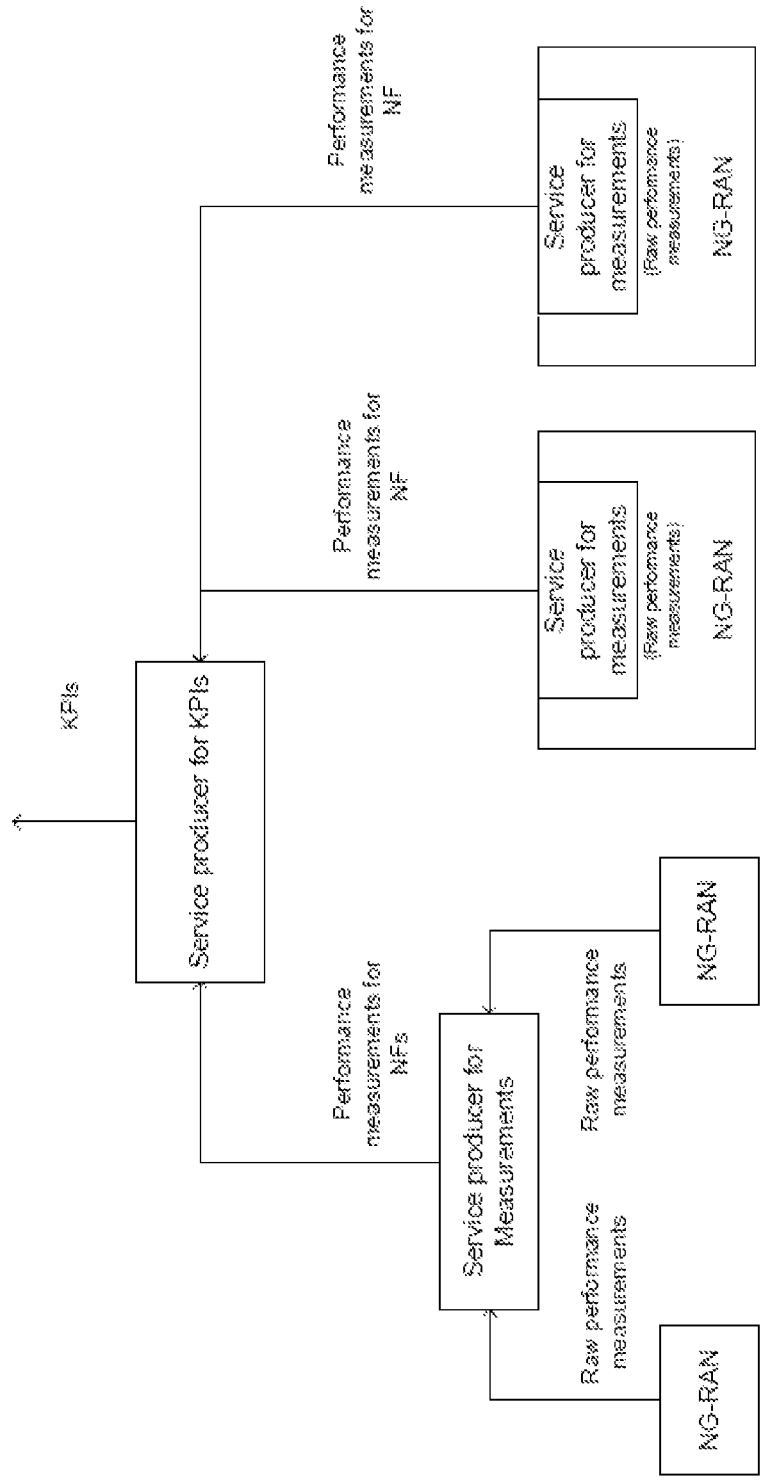
FIG. 6 illustrates network slice performance measurement Generation in accordance with some embodiments.

FIG. 4 illustrates user plane packet delay in accordance with some embodiments. As shown, a service producer collects the raw performance measurements from NFs, and then generates the performance measurements for NFs for its consumers. Specifically, the NF in FIG. 4 may be a gNB-CU-UP and/or gNB-DU. The service producer may be implemented within the NF or in a separate management system. Other implementations of network slice performance measurement generation are shown in the next several FIGS. In particular, FIG. 5A illustrates network slice performance measurement generation in accordance with some embodiments. FIG. 5B illustrates network slice performance measurement generation in accordance with some embodiments. FIG. 6 illustrates network slice performance measurement generation in accordance with some embodiments. The monitored measurements are provided below:

6.3.1.x Integrated uplink delay in NG-RAN 6.3.1.x.1 Integrated uplink delay in NG-RAN for a sub-network a) DelayUlIntNgranSNw.

b) This KPI describes the average UL packet delay through the NG-RAN from the UE for a sub-network. It is the average integrated packet delay from the time when an UE RLC SDU was scheduled until the time when the corresponding Packet Data Convergence Protocol (PDCP) SDU was sent to the core network from gNB-CU-UP. The KPI type is MEAN in units of 0.1 ms. This KPI can optionally be split into KPIs per QoS level (mapped 5Q1 or QCI in NR option 3) and per S-NSSAI.

c) This KPI is the sum of: 1) the weighted average of UL packet delay, including UL delay on the air interface and UL delay within the NR Cell DU, for all NRCellDU managed object instances (MOIs) contained by the SubNetwork MOI, and 2) the weighted average of UL packet delay, including UL delay on the F1 interface and UL delay within the gNB-CU-UP, for all GNBCUUPFunction MOIs contained by the SubNetwork MOI.

This KPI is calculated in the following formula:

$$DelayUlIntNgranSNw = \frac{\sum_{NRCellDU}((DRB \cdot RlcDelayUl + DRB \cdot AirIfDelayUl) * WeightDuUl)}{\sum_{NRCellDU} WeightDuUl} +$$

$$\frac{\sum_{GNBCUUPFunction}((A) * WeightCuupUl)}{\sum_{GNBCUUPFunction} WeightCuupUl}$$

where $A = DRB \cdot PdcpReordDelayUl + DRB \cdot PdcpF1DelayUl$ where the WeightDuUl could be one of the following measurements:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU; or

Number of UL user plane Transport Blocks (TBs) of the NR Cell in the gNB-DU; and the WeightCupUl could be one of the following measurements:

UL user plane data volume of the gNB-CU-UP, such as UL user plane PDCP data volume (QosFlow.PdcpPduVolumeUl_Filter); or Number of UL user plane PDCP packets of the gNB-CU-UP.

For the optional KPI per QoS level (mapped 5QI or QCI in NR option 3), the KPI is calculated using the same principles but by the measurements (subcounters) per QoS level. The KPI formula is as follows where the QoS identifies the QoS level:

$$DelayUlIntNgranSNw \cdot QoS =$$

$$\frac{\sum_{NRCellDU}((DRB \cdot RlcDelayUl \cdot QoS + DRB \cdot AirIfDelayUl \cdot QoS) * WeightDuUl \cdot QoS)}{\sum_{NRCellDU} WeightDuUl \cdot QoS} +$$

$$\frac{\sum_{GNBCUUPFunction}((B) * WeightCuupUl \cdot QoS)}{\sum_{GNBCUUPFunction} WeightCuupUl \cdot QoS},$$

where $B = DRB \cdot PdcpReordDelayUl \cdot QoS + DRB \cdot PdcpF1DelayUl \cdot QoS$ For the optional KPI per Single Network Slice Selection Assistance Information (S-NSSAI), the KPI is calculated using the same principles but by the measurements (subcounters) per S-NSSAI. The KPI formula is as follows where the SNSSAI identifies the S-NSSAI:

$$DelayUlIntNgranSNw \cdot SNSSAI = \frac{\sum_{NRCellDU}(C) * WeightDuDl \cdot SNSSAI)}{\sum_{NRCellDU} WeightDuUl \cdot SNSSAI} +$$

-continued $$\frac{\sum_{GNBCUUPFunction}((D) * WeightCuupUl \cdot SNSSAI)}{\sum_{GNBCUUPFunction} WeightCuupUl \cdot SNSSAI},$$

where $C = DRB \cdot RlcDelayUl \cdot SNSSAI + DRB \cdot AirIfDelayUl \cdot SNSSAI$, and $D = DRB \cdot PdcpReordDelayUl \cdot SNSSAI + DRB \cdot PdcpF1DelayUl \cdot SNSSAI$ d) SubNetwork e) It is assumed that the F1 uplink delay is the same as the F1 downlink delay, so DRB.PdcpF1DelayUl equals DRB.PdcpF1DelayDl. For non-split gNBs, the value of DRB.PdcpF1DelayUl (optionally DRB.PdcpF1DelayUl.QOS and optionally DRB.PdcpF1DelayUl.SNSSAI) is set to zero for the corresponding GNBCUUPFunction because there are no F1-interfaces in this scenario.

6.3.1.x.2 Integrated uplink delay in NG-RAN for a network slice subnet a) DelayUlIntNgranNss.

b) This KPI describes the average UL packet delay through the NG-RAN from the UE for a network slice subnet. It is the average integrated packet delay from the time when an UL RLC SDU was scheduled until the time when the corresponding PDCP SDU was sent to the core network from the gNB-CU-UP. The KPI type is MEAN in units of 0.1 ms.

c) This KPI is the sum of: 1) the weighted average of UL packet delay, including UL delay on the air interface and UL delay within the NR Cell DU, for all NRCellDU MOIs associated with the NetworkSliceSubnet MOI, and 2) the weighted average of UL packet delay, including UL delay on the F1 interface and UL delay within the gNB-CU-UP, for all GNBCUUPFunction MOIs associated with the NetworkSliceSubnet MOI.

This KPI is calculated in the following formula:

$$DelayUlIntNgranNss = \frac{\sum_{NRCellDU}((E) * WeightDuUl \cdot SNSSAI)}{\sum_{NRCellDU} WeightDuUl \cdot SNSSAI} +$$

$$\frac{\sum_{GNBCUUPFunction}((F) * WeightCuupUl \cdot SNSSAI)}{\sum_{GNBCUUPFunction} WeightCuupUl \cdot SNSSAI},$$

where $E = DRB \cdot RlcDelayUl \cdot SNSSAI + DRB \cdot AirIfDelayUl \cdot SNSSAI$ and $F = DRB \cdot RlcDelayUl \cdot SNSSAI + DRB \cdot AirIfDelayUl \cdot SNSSAI$ Where the WeightDuUl could be one of the following measurements (subcounters) per S-NSSAI:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU; or

Number of UL user plane TBs of the NR Cell in g the NB-DU, the WeightCuupUl could be one of the following measurements (subcounters) per S-NSSAI:

UL user plane data volume of the GNB-CU-UP such as UL user plane PDCP data volume (QosFlow.PdcpPduVolumeUl_filter); or Number of UL user plane PDCP packets of the gNB-CU-UP; and the SNSSAI identifies the S-NSSAI that the network slice subnet supports.

d) NetworkSliceSubnet e) It is assumed that the F1 uplink delay is the same as the F1 downlink delay, so DRB.PdcpF1DelayUl equals DRB.PdcpF1DelayDl. For the non-split gNBs, the value of DRB.PdcpF1DelayUl.SNSSAI is set to zero for the corresponding GNBCUUPFunction because there are no F1-interfaces in this scenario.

6.3.1.x.3 Integrated uplink delay in NG-RAN for a network slice a) DelayUlIntNgranNs.

b) This KPI describes the average UL packet delay through the NG-RAN from the UE for a network slice. It is the average integrated packet delay from the time when an UL RLC SDU was scheduled until the time when the corresponding PDCP SDU was sent to the core network from gNB-CU-UP. The KPI type is MEAN in units of 0.1 ms.

c) This KPI is the sum of: 1) the weighted average of UL packet delay, including UL delay on the air interface and UL delay within the NR Cell DU, for all NRCellDU MOIs supporting the network slice (identified by the S-NSSAI) represented by the NetworkSlice MOI, and 2) the weighted average of UL packet delay, including UL delay on the F1 interface and UL delay within the gNB-CU-UP, for all GNBCUUPFunction MOIs supporting the network slice (identified by the S-NSSAI) represented by the NetworkSlice MOI.

This KPI is calculated in the following formula:

$$DelayUlIntNgranNs = \frac{\sum_{NRCellDU}((G) * WeightDuUl \cdot SNSSAI)}{\sum_{NRCellDU} WeightDuUl \cdot SNSSAI} + \frac{\sum_{GNBCUUPFunction}((H) * WeightCuupUl \cdot SNSSAI)}{\sum_{GNBCUUPFunction} WeightCuupUl \cdot SNSSAI},$$

where $G = DRB \cdot RlcDelayUl \cdot SNSSAI + DRB \cdot AirIfDelayUl \cdot SNSSAI$ and $H = DRB \cdot PdcpReordDelayUl \cdot SNSSAI + DRB \cdot PdcpF1DelayUl \cdot SNSSAI$ Where the WeightDuUl could be one of the following measurements (subcounters) per S-NSSAI:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU; or

Number of UL user plane TBs (Transport Blocks) of the NR Cell in the gNB-DU;

the WeightCuupUl could be one of the following measurements (subcounters) per S-NSSAI:

UL user plane data volume of the GNB-CU-UP, such as UL user plane PDCP data volume (QosFlow.PdcpPduVolumeUl_Filter); or Number of UL user plane PDCP packets of the gNB-CU-UP;

and the SNSSAI identifies the S-NSSAI, i.e., the identifier of the network slice.

d) NetworkSlice

It is assumed that the F1 uplink delay is the same as the F1 downlink delay, so DRB.PdcpF1DelayUl equals DRB.PdcpF1DelayDl. For the non-split gNBs, the value of DRB.PdcpF1DelayUl.SNSSAI is set to zero for the corresponding GNBCUUPFunction because there are no F1-interfaces in this scenario.

6.3.1.x Integrated downlink delay in NG-RAN 6.3.1.x.1 Integrated downlink delay in NG-RAN for a sub-network a) DelayDlIntNgranSNw.

b) This KPI describes the average DL packet delay through the NG-RAN to the UE for a sub-network. It is the average integrated packet delay from reception of IP packet in gNB-CU-UP until the last part of an RLC SDU packet was received by the UE according to received Hybrid Automatic Repeat Request (HARQ) feedback information for unacknowledge mode (UM) or until the last part of an RLC SDU packet was received by the UE according to a received RLC acknowledgment (ACK) for acknowledge mode (AM). The KPI type is MEAN in units of 0.1 ms. This KPI can optionally be split into KPIs per QoS level (mapped 5QI or QCI in NR option 3) and per S-NSSAI.

c) This KPI is the sum of: 1) the weighted average of DL packet delay, including DL delay on the air interface and DL delay within the NR Cell DU, for all NRCellDU MOIs contained by the SubNetwork MOI, and 2) the weighted average of DL packet delay, including DL delay on the F1 interface and DL delay within the gNB-CU-UP, for all GNBCUUPFunction MOIs contained by the SubNetwork MOI.

This KPI is calculated in the following formula:

$$DelayDlIntNgranSNw =$$
$$\frac{\sum_{NRCellDU}((I) * WeightDuDl)}{\sum_{NRCellDU} WeightDuDl} + \frac{\sum_{GNBCUUPFunction}((J) * WeightCuupDl)}{\sum_{GNBCUUPFunction} WeightCuupDl}$$

Where $I = DRB \cdot RlcSduDelayDl + DRB \cdot AirIfDelayDl$ and $J = DRB \cdot PdcpSduDelayDl + DRB \cdot PdcpF1DelayDl$ Where the WeightDuDl could be one of the following measurements:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU; or

Number of DL user plane TBs of the NR Cell in the gNB-DU; and the WeightCuupDl could be one of the following measurements:

DL user plane data volume of the gNB-CU-UP, such as DL user plane PDCP data volume (QosFlow.PdcpPduVolumeDl_Filter); or Number of DL user plane PDCP packets of the gNB-CU-UP.

For the optional KPI per QoS level (mapped 5QI or QCI in NR option 3), the KPI is calculated using the same principles but by the measurements (subcounters) per QoS level. The KPI formula is as follows where the QOS identies the QoS level:

$$DelayDlIntNgranSNw \cdot QoS = \frac{\sum_{NRCellDU}((K) * WeightDuDl \cdot QoS)}{\sum_{NRCellDU} WeightDuDl \cdot QoS} +$$

$$\frac{\sum_{GNBCUUPFunction}((L) * WeightCuupDl \cdot QoS)}{\sum_{GNBCUUPFunction} WeightCuupDl \cdot QoS}$$

Where $K = DRB \cdot RlcSduDelayDl \cdot QoS + DRB \cdot AirIfDelayDl \cdot QoS$ and $L = DRB \cdot PdcpSduDelayDl \cdot QoS + DRB \cdot PdcpF1DelayDl \cdot QoS$ For the optional KPI per S-NSSAI, the KPI is calculated using the same principles but by the measurements (subcounters) per S-NSSAI. The KPI formula is as follows where the SNSSAI identifies the S-NSSAI:

$$DelayDlIntNgranSNw \cdot SNSSAI =$$

$$\frac{\sum_{NRCellDU}((M) * WeightDuDl \cdot SNSSAI)}{\sum_{NRCellDU} WeightDuDl \cdot SNSSAI} +$$

$$\frac{\sum_{GNBCUUPFunction}((N) * WeightCuupDl \cdot SNSSAI)}{\sum_{GNBCUUPFunction} WeightCuupDl \cdot SNSSAI}$$

Where $M = DRB \cdot RlcSduDelayDl \cdot SNSSAI +$ $DRB \cdot AirIfDelayDl \cdot SNSSAI$ and $N = DRB \cdot PdcpSduDelayDl \cdot SNSSAI + DRB \cdot PdcpF1DelayDl \cdot SNSSAI$ d) SubNetwork e) It is assumed that the F1 uplink delay is the same as the F1 downlink delay, so DRB.PdcpF1DelayDl equals DRB.PdcpF1DelayUl. For the non-split gNBs, the value of DRB.PdcpF1DelayDl (optionally DRB.PdcpF1DelayDl.QOS, and optionally DRB.PdcpF1DelayDl.SNSSAI) is set to zero for the corresponding GNBCUUPFunction because there are no F1-interfaces in this scenario.

6.3.1.x.2 Integrated downlink delay in NG-RAN for a network slice subnet a) DelayDlIntNgranNss.

b) This KPI describes the average DL packet delay through the NG-RAN from the UE for a network slice subnet. It is the average integrated packet delay from reception of IP packet in the gNB-CU-UP until the last part of an RLC SDU packet was received by the UE according to received HARQ feedback information for UM mode or until the last part of an RLC SDU packet was received by the UE according to received RLC ACK for AM mode. The KPI type is MEAN in units of 0.1 ms.

c) This KPI is the sum of: 1) the weighted average of DL packet delay, including DL delay on the air interface and DL delay within the NR Cell DU, for all NRCellDU MOIs associated with the NetworkSliceSubnet MOI, and 2) the weighted average of DL packet delay, including DL delay on the F1 interface and DL delay within the gNB-CU-UP, for all GNBCUUPFunction MOIs associated with the NetworkSliceSubnet MOI.

This KPI is calculated in the following formula:

$$DelayDlIntNgranNss = \frac{\sum_{NRCellDU}((O) * WeightDuDl \cdot SNSSAI)}{\sum_{NRCellDU} WeightDuDl \cdot SNSSAI} +$$

$$\frac{\sum_{GNBCUUPFunction}((P) * WeightCuupDl \cdot SNSSAI)}{\sum_{GNBCUUPFunction} WeightCuupDl \cdot SNSSAI},$$

where $O = DRB \cdot RlcSduDelayDl \cdot SNSSAI +$ $DRB \cdot AirIfDelayDl \cdot SNSSAI$ and $P = DRB \cdot PdcpSduDelayDl \cdot SNSSAI + DRB \cdot PdcpF1DelayDl \cdot SNSSAI$ Where the WeightDuDl could be one of the following measurements (subcounters) per S-NSSAI:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU; or

Number of DL user plane TBs of the NR Cell in the gNB-DU;

the WeightCuupDl could be one of the following measurements (subcounters) per S-NSSAI:

DL user plane data volume of the gNB-CU-UP, such as DL user plane PDCP data volume (QosFlow.PdcpPduVolumeDl_Filter); or Number of DL user plane PDCP packets of the gNB-CU-UP; and the SNSSAI identifies the S-NSSAI that the network slice subnet supports.

d) NetworkSliceSubnet e) It is assumed that the F1 uplink delay is the same as the F1 downlink delay, so DRB.PdcpF1DelayDl equals DRB.PdcpF1DelayUl. For the non-split gNBs, the value of DRB.PdcpF1DelayDl.SNSSAI is set to zero for the corresponding GNBCUUPFunction because there are no F1-interfaces in this scenario.

6.3.1.x.3 Integrated downlink delay in NG-RAN for a network slice a) DelayDlIntNgranNs.

h) This KPI describes the average DL packet delay through the NG-RAN from the UE for a network slice. It is the average integrated packet delay from reception of IP packet in the gNB-CU-UP until the last part of an RLC SDU packet was received by the UE according to received HARQ feedback information for UM mode or until the last part of an RLC SDU packet was received by the UE according to received RLC ACK for AM mode. The KPI type is MEAN in units of 0.1 ms.

c) This KPI is the sum of: 1) the weighted average of DL packet delay, including DL delay on the air interface and DL delay within the NR Cell DU, for all NRCellDU MOIs supporting the network slice (identified by the S-NSSAI) represented by the NetworkSlice MOI, and 2) the weighted average of DL packet delay, including DL delay on the F1 interface and DL delay within the gNB-CU-UP, for all GNBCUUPFunction MOIs supporting the network slice (identified by the S-NSSAI) represented by the NetworkSlice MOI.

This KPI is calculated in the following formula:

$$DelayDlIntNgranNs = \frac{\sum_{NRCellDU}((Q) * WeightDuDl \cdot SNSSAI)}{\sum_{NRCellDU} WeightDuDl \cdot SNSSAI} +$$

-continued $$\frac{\sum_{GNBCUUPFunction}((R) * WeightCuupDl \cdot SNSSAI)}{\sum_{GNBCUUPFunction} WeightCuupDl \cdot SNSSAI},$$

Where $Q = DRB \cdot RlcSduDelayDl \cdot SNSSAI +$ $DRB \cdot AirIfDelayDl \cdot SNSSAI$ and $R = DRB \cdot PdcpSduDelayDl \cdot SNSSAI + DRB \cdot PdcpF1DelayDl \cdot SNSSAI$ Where the WeightDuDl could be one of the following measurements (subcounters) per S-NSSAI:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU; or

Number of DL user plane TBs of the NR Cell in the gNB-DU;

the WeightCuupDl could be one of the following measurements (subcounters) per S-NSSAI:

DL user plane data volume of the gNB-CU-UP, such as DL user plane PDCP data volume (QosFlow.PdcpPduVolumeDl_Filter); or Number of DL user plane PDCP packets of the gNB-CU-UP; and the SNSSAI identifies the S-NSSAI, i.e., the identifier of the network slice.

d) NetworkSlice e) It is assumed that the F1 uplink delay is the same as the F1 downlink delay, so DRB.PdcpF1DelayDl equals DRB.PdcpF1DelayUl. For the non-split gNBs, the value of DRB.PdcpF1DelayDl.SNSSAI is set to zero for the corresponding GNBCUUPFunction because there are no F1-interfaces in this scenario.

3. Performance measurements 5.1.1.x RLC SDU data volume of NR cell 5.1.1.x.1 DL user plane RLC SDU data volume a) This measurement provides the downlink user plane RLC SDU data volume of the NR cell sent by the gNB-DU to the UEs. The measurement is split into subcounters per QoS level (mapped 5QI or QCI in NR option 3) and per supported S-NSSAI.

b) CC.

c) Transmission of a DL user plane RLC SDU by the gNB-DU to the UE. The volume of the RLC SDU is added to the relevant subcounters per QoS level (mapped 5QI or QCI in NR option 3) and per supported S-NSSAI.

Each measurement is an integer value representing the number of bits measured in Mbits (1 MBits=1000*1000 bits).

e) DRB.RlcVolumeDL.QoS, where the QoS identifies the QoS level (mapped 5QI or QCI in NR option 3);

DRB.Rlc-VolumeDL.SNSSAI, where the SNAASI identifies the S-NSSAI.

f) NRCellDU.

g) Valid for packet switched traffic.

h) 5GS.

5.1.1.x.2 UL user plane RLC SDU data volume a) This measurement provides the uplink user plane RLC SDU data volume of the NR cell received by the gNB-DU from the UEs. The measurement is split into subcounters per QoS level (mapped 5Q1 or QCI in NR option 3) and per supported S-NSSAI.

b) CC.

c) Receipt of a UL user plane RLC SDU by the gNB-DU from the UE. The volume of the RLC SDU is added to the relevant subcounters per QoS level (mapped 5QI or QCI in NR option 3) and per supported S-NSSAI.

Each measurement is an integer value representing the number of bits measured in Mbits (1 MBits=1000*1000 bits).

e) DRB.RlcVolumeUL.QoS, where the QoS identifies the QoS level (mapped 5QI or QCI in NR option 3);

DRB,RlcVolumeUL.SNSSAI, where the SNSSAI identifies the S-NSSAI.

f) NRCellDU.

g) Valid for packet switched traffic.

h) 5GS.

5.1.1.y RLC SDU packets of NR cell 5.1.1.y.1 Number of DL user plane RLC SDU packets a) This measurement provides the number of downlink user plane RLC SDU packets of the NR cell sent by the gNB-DU to the UEs. The measurement is split into subcounters per QoS level (mapped 5QI or QCI in NR option 3) and per supported S-NSSAI.

b) CC.

c) Transmission of a DL user plane RLC SDU by the gNB-DU to the UE. Each transmitted RLC SDU packet increments the relevant subcounters per QoS level (mapped 5QI or QCI in NR option 3) and relevant subcounters per supported S-NSSAI by 1 respectively.

d) Each measurement is an integer value.

e) DRB.RlcSduNbrDL.QoS, where the QoS identifies the QoS level (mapped 5QI or QCI NR option 3);

DRB.RIcSduNbrDL.SNSSAI, where the SNSSAI identifies the S-NSSAI:

f) NRCellDU.

g) Valid for packet switched traffic.

h) 5GS.

5.1.1.y.2 Number of UL user plane RLC SDU packets a) This measurement provides the number of uplink user plane RLC SDU packets of the NR cell received by the gNB-DU from the UEs. The measurement is split into subcounters per QoS level (mapped 5Q1 or QCI in NR option 3) and per supported S-NSSAI.

b) CC.

c) Receipt of a DL user plane RLC SDU by the gNB-DU from the UE. Each received RLC SDU packet increments the relevant subcounters per QoS level (mapped 5QI or QCI in NR option 3) and relevant subcounters per supported S-NSSAI by 1 respectively.

d) Each measurement is an integer value.

e) DRB.RlcSduNbrUL.QoS where the QoS identities the QoS level (mapped 5QI or QCI in NR option 3);

DRB.RlcSduNbrUL.SNSSAI, here the SNSSAI identifies the S-NSSAI.

f) NRCellDU.

g) Valid for packet switched traffic.

h) 5GS.

In addition to the above, it is desirable to monitor other KPIs on UL/DL delay (including the delay on the air-interface and the delay in the gNB DU) related to the gNB. In 5GC, the user plane data traffic is transmitted on the N9 interface between the PSA UPF and an intermediate UPF (I-UPF). The data volume of GTP data packets on the N9 interface is helpful for operators to understand the traffic distribution of the 5GC and evaluate and optimize the bandwidth of the N9 interface. The number of GTP packets on the N9 interface is relevant to the packets processing that may result in larger or smaller packet delay. Therefore, the data volume and number of GTP data packets on the N9 interface may be monitored.

KPIs on e2e UL/DL delay for a network slice may be desired. The e2e UL/DL delay can directly reflect the users' experience, therefore the performance of the e2e UL/DL delay may be monitored.

6.3.1.x Uplink delay related to gNB DU 6.3.1.x.1 Average uplink delay far a gNB DU a) DelayUlGnbDu.

h) This KPI describes the average UL packet delay through the gNB DU from the UE for a gNB DU, including the delay on the air-interface and the delay in the gNB DU. It is the average packet delay from the time when an UL RLC SDU was scheduled at the UE until the time when the corresponding RLC SDU was sent by the gNB DU to the gNB-CU-UP. The KPI type is MEAN in units of 0.1 ms. This KPI can optionally be split into KPIs per QoS level (mapped 5Q1 or QCI in NR option 3) and per S-NSSAI.

c) This KPI is the weighted average of UL packet delay, including UL delay on the air interface and UL delay within the NR Cell DU, for all NRCellDU MOIs contained by the GNBDUFunction MOI.

This KPI is calculated in the following formula:

$$DelayUlGnbDu = \frac{\sum_{NRCellDU}((DRB \cdot RlcDelayUl + DRB \cdot AirIfDelayUl) * WeightDuUl))}{\sum_{NRCellDU} WeightDuUl}$$

Where the WeightDuUl could be one of the following measurements:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU;

Number of UL user plane TBs of the NR Cell in the gNB-DU.

For the optional KPI per QoS level (mapped 5QI or QCI in NR option 3), the KPI is calculated using the same principles but by the measurements (subcounters) per QoS level. The KPI formula is as follows where the QoS identifies the QoS level:

$$DelayUlGnbDu \cdot QoS = \frac{\sum_{NRCellDU}((DRB \cdot RlcDelayUl \cdot QoS + DRB \cdot AirIfDelayUl \cdot Qos) * WeightDuUl \cdot QoS))}{\sum_{NRCellDU} WeightDuUl \cdot QoS}$$

For the optional KPI per S-NSSAI, the KPI is calculated using the same principles but by the measurements (subcounters) per S-NSSAI. The KPI formula is as follows where the SNSSAI identifies the S-NSSAI:

$$DelayUlGnbDu \cdot SNSSAI = \frac{\sum_{NRCellDU}((S) * WeightDuUl \cdot SNSSAI)}{\sum_{NRCellDU} WeightDuUl \cdot SNSSAI},$$

Where $S = DRB \cdot RlcDelayUl \cdot SNSSAI + DRB \cdot AifIfDelayUl \cdot SNSSAI$ d) GNBDUFunction 6.3.1.x.2 Average uplink delay of gNB DUs for a sub-network a) DelayUlGnbDuSNw.

b) This KPI describes the average UL packet delay through the gNB DU from the UE for a sub-network, including the delay on the air-interface and the delay in the gNB DU. It is the average packet delay from the time when an UL RLC SDU was scheduled at the UE until the time when the corresponding RLC SDU was sent by the gNB DU to the gNB-CU-UP. The KPI type is MEAN in units of 0.1 ms. This KPI can optionally be split into KPIs per QoS level (mapped 5QI or QCI in NR option 3) and per S-NSSAI.

c) This KPI is the weighted average of UL packet delay, including UL delay on the air interface and UL delay within the NR Cell DU, for all NRCellDU MOIs contained by the SubNetwork MOI.

This KPI is calculated in the following formula:

$$DelayUlGnbDuSNw = \frac{\sum_{NRCellDU}((DRB \cdot RlcDelayUl + DRB \cdot AirIfDelayUl) * WeightDuUl))}{\sum_{NRCellDU} WeightDuUl}$$

Where the weightDuUl could be one of the following measurements:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU;

Number of UL user plane TBs of the NR Cell in the gNB-DU.

For the optional KPI per QoS level (mapped 5QI or QCI in NR option 3), the KPI is calculated using the same principles but by the measurements (subcounters) per QoS level. The KPI formula is as follows where the QoS identifies the QoS level:

$DelayUlGnbDuSNw \cdot QoS =$ $$\frac{\sum_{NRCellDU}((DRB \cdot RlcDelayUl \cdot Qos + DRB \cdot AirIfDelayUl \cdot Qos) * WeightDuUl \cdot QoS))}{\sum_{NRCellDU} WeightDuUl \cdot QoS}$$

For the optional KPI per S-NSSAI, the KPI is calculated using the same principles but by the measurements (subcounters) per S-NSSAI. The KPI formula is as follows where the SNSSAI identifies the S-NSSAI:

$$DelayUlGnbDuSNw \cdot SNSSAI =$$

$$\frac{\sum_{NRCellDU}((DRB \cdot RlcDelayUl \cdot SNSSAI + DBR \cdot AirIfDelayUl \cdot SNSSAI) * WeightDuUl \cdot SNSSAI))}{\sum_{NRCellDU} WeightDuUl \cdot SNSSAI}$$

d) SubNetwork 6.3.1.x.3 Average uplink delay of gNB DUs for a network slice subnet a) DelayUlGnbDuNss.

b) This KPI describes the average UL packet delay through the gNB DU from the UE for a network slice subnet, including the delay on the air-interface and the delay in the gNB DU. It is the average packet delay from the time when an UL RLC SDU was scheduled at the UE until the time when the corresponding RLC SDU was sent by the gNB DU to the gNB-CU-UP. The KPI type is MEAN in units of 0.1 ms.

c) This KPI is the weighted average of UL packet delay, including UL delay on the air interface and UL delay within the NR Cell DU, for all NRCellDU MOIs associated with the NetworkSliceSubnet MOI.

This KPI is calculated in the following formula:

$$DelayUlGnbDuSNw =$$

$$\frac{\sum_{NRCellDU}((DRB \cdot RlcDelayUl \cdot SNSSAI + DRB \cdot AirIfDelayUl \cdot SNSSAI) * WeightDuUl \cdot SNSSAI))}{\sum_{NRCellDU} WeightDuUl \cdot SNSSAI}$$

Where the weightDuUl could be one of the following measurements (subcounters) per S-NSSAI:

UL user plane data volume of the NR Cell in the gNB-DU, such as UL user plane RLC SDU data volume or UL user plane RLC PDU data volume;

UL user plane PDCP data volume (QosFlow.PdcpPduVolumeUl_Filter) of the NR Cell in the gNB-CU;

Number of UL user plane PDCP packets of the NR Cell in the gNB-CU;

Number of UL user plane RLC packets of the NR Cell in the gNB-DU; or

Number of UL user plane TBs of the NR Cell in the gNB-DU; and the SNSSAI identifies the S-NSSAI that the network slice subnet supports, d) NetworkSliceSubnet 6.3.1.y Downlink delay related to gNB DU 6.3.1.y.1 Average downlink delay for a gNB DU a) DelayDlGnbDu.

b) This KPI describes the average DL packet delay through the gNB DU to the UE for a gNB DU, including the delay on the air-interface and the delay in the gNB DU. It is the average packet delay from the time when an DL RLC SDU was scheduled at the gNB DU until the time when the corresponding RLC SDU was received by the UE. The KPI type is MEAN in units of 0.1 ms. This KPI can optionally be split into KPIs per level (mapped 5QI or QCI in NR option 3) and per S-NSSAI.

c) This KPI is the weighted average of DL packet delay, including DL delay on the air interface and DL delay within the NR Cell DU, for all NRCellDU MOIs contained by the GNBDUFunction MOI.

This KPI is calculated in the following formula:

$$DelayDlGnbDu = \frac{\sum_{NRCellDU}((DRB \cdot RlcSduDelayDl + DRB \cdot AirIfDelayDl) * WeightDuDl))}{\sum_{NECellDU} WeightDuDl}$$

Where the WeightDuDl could be one of the following measurements:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU; or

Number of DL user plane TBs of the NR Cell in the gNB-DU.

For the optional KPI per QoS level (mapped 5QI or QCI in NR option 3), the KPI is calculated using the same principles but by the measurements (subcounters) per QoS level. The KPI formula is as follows where the QoS identifies the QoS level:

$$DelayDlGnbDu \cdot QoS = \frac{\sum_{NRCellDU}((DRB \cdot RlcSduDelayDl \cdot Qos + DRB \cdot AirIfDelayDl \cdot QoS) * WeightDuDl \cdot QoS))}{\sum_{NRCellDU} WeightDuDl \cdot QoS}$$

For the optional KPI per S-NSSAI, the KPI is calculated using the same principles hut by the measurements (subcounters) per S-NSSAI. The KPI formula is as follows where the SNSSAI identifies the S-NSSAI:

$$DelayDlGnbDu \cdot SNSSAI =$$

$$\frac{\sum_{NRCellDU}((DRB \cdot RlcSduDelayDl \cdot SNSSAI + DRB \cdot AirIfDelayDl \cdot SNSSAI) * WeightDuDl \cdot SNSSAI))}{\sum_{NRCellDU} WeightDuDl \cdot SNSSAI}$$

d) GNBDUFunction 6.3.1.y.2 Average downlink delay of gNB DUs for a sub-network a) DelayDlGnbDuSNw.

b) This KPI describes the average DL packet delay through the gNB DU to the UE for a sub-network, including the delay on the air-interface and the delay in the gNB DU. It is the average packet delay from the time when an DL RLC SDU was scheduled at the gNB DU until the time when the corresponding RLC SDU was received by the UE. The KPI type is MEAN in units of 0.1 ms. This KPI can optionally be split into KPIs per QoS level (mapped 5QI or QCI in NR option 3) and per S-NSSAI.

c) This KPI is the weighted average of DL packet delay, including DL delay on the air interface and DL delay within the NR Cell DU, for all NRCellDU MOIs contained by the SubNetwork MOI.

This KPI is calculated in the following formula:

$$DelayDlGnbDuSNw = \frac{\sum_{NRCellDU}((DRB \cdot RlcSduDelayDl + DRB \cdot AirIfDelayDl) * WeightDuDl))}{\sum_{NRCellDU} WeightDuDl}$$

Where the WeightDuDl could be one of the following measurements:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU; or

Number of DL user plane TBs of the NR Cell in the gNB-DU.

For the optional KPI per QoS level (mapped 5Q1 or QCI in NR option 3), the KPI is calculated using the same principles but by the measurements (subcounters) per QoS level, The KPI formula is as follows where the QoS identifies the QoS level:

$$DelayDlGnbSNw \cdot QoS = \frac{\sum_{NRCellDU}((DRB \cdot RlcSduDelayDl \cdot QoS + DRB \cdot AirIfDelayDl \cdot QoS) * WeightDuDl \cdot QoS))}{\sum_{NRCellDU} WeightDuDl \cdot QoS}$$

For the optional KPI per S-NSSAI, the KPI is calculated using the same principles but by the measurements (subcounters) per S-NSSAI. The KPI formula is as follows where the SNSSAI identifies the S-NSSAI:

$$DelayDlGnbDuSNw \cdot SNSSAI = $$
$$\frac{\sum_{NRCellDU}((DRB \cdot RlcSduDelayDl \cdot SNSSAI + DRB \cdot AirIfDelayDl \cdot SNSSAI) * WeightDuDl \cdot SNSSAI))}{\sum_{NRCellDU} WeightDuDl \cdot SNSSAI}$$

d) SubNetwork 6.3.1.y.3 Average downlink delay of gNB DUs for a network slice subnut a) DelayDlGnbDuNss.

This KPI describes the average Dl, packet delay through the gNB DU to the UE for a network slice subnet, including the delay on the air-interface and the delay in the gNB DU. It is the average packet delay from the time when an DL RLC SDU was scheduled at the gNB DU until the time when the corresponding RLC SDU was received by the UE. The KPI type is MEAN in units of 0.1 ms. This KPI can optionally be split into KPIs per QoS level (mapped 5QI or QCI in NR option 3) and per S-NSSAI.

c) This KPI is the weighted average of DL packet delay, including DL delay on the air interface and DL delay within the NR Cell DU, for all NRCellDU MOIs associated with the NetworkSliceSubnet MOI.

This KPI is calculated in the following formula:

$$DelayDlIntNgranNss = $$
$$\frac{\sum_{NRCellDU}((DRB \cdot RlcSduDelayDl \cdot SNSSAI + DRB \cdot AirIfDelayDl \cdot SNSSAI) * WeightDuDl \cdot SNSSAI))}{\sum_{NRCellDU} WeightDuDl \cdot SNSSAI}$$

Where the WeightDuDl could be one of the following measurements (subcounters) per S-NSSAI:

DL user plane data volume of the NR Cell in the gNB-DU, such as DL user plane RLC SDU data volume or DL user plane RLC PDU data volume;

DL user plane PDCP data volume (QosFlow.PdcpPduVolumeDl_Filter) of the NR Cell in the gNB-CU;

Number of DL user plane PDCP packets of the NR Cell in the gNB-CU;

Number of DL user plane RLC packets of the NR Cell in the gNB-DU, or

Number of DL user plane TBs of the NR Cell in the gNB-DU; and the SNSSAI identifies the S-NSSAI that the network slice subnet supports.

d) NetworkSliceSubnet 6.3.1.z E2E delay for network slice 6.3.1.z.1 Average e2e uplink delay for a network slice a) DelayE2EUlNss.

b) This KPI describes the average e2e UL packet delay between the PSA UPF and the UE for a network slice. It is the average packet delay from the time when an UL RLC SDU was scheduled at the UE until the time when the corresponding GTP PDU was received by the PSA UPF. The KPI type is MEAN in units of 0.1 ms.

c) This KPI is the weighted average of UL packet delay between the PSA UPF and UE for all N3 interfaces (modelled by EP_N3 MOI) and N9 interfaces (modelled by EP_N9 MOI) of all PSA UPFs supporting the network slice (modelled by NetworkSlice MOI) identified by the S-NSSAI.

This KPI is calculated in the following formula:

$$DelayE2EUlNss = $$
$$\frac{\sum_{NP\_N_3}(T * WeightN3Ul) + \sum_{EP\_N_9}(T * WeightN9Ul)}{\sum_{EP\_N_3} WeightN3Ul + \sum_{EP\_N_9} WeightN9Ul}$$

Where $T = GTP \cdot DelayUlPsaUpfUeMean \cdot SNSSAI$

Where the WeightN3Ul could be one of the following measurements (subcounters) per S-NSSAI:

Number of octets of incoming GTP data packets on the N3 interface from (R)AN to UPF (GTP.OutDataOctN3UPF.SNSSAI); or Number of incoming GTP data packets on the N3 interface from (R)AN to UPF (GTP.InDataPktN3UPF.SNSSAI).

Where the Weight-N9Ul could be one of the following measurements (subcounters) per S-NSSAI:

Number of octets of incoming GTP data packets on the N9 interface for the PSA UPF (GTP.InDataOctN9PsaUpf.SNSSAI); or Number of incoming GTP data packets on the N9 interface for the PSA UPF (GTP.InDataPktN9PsaUpf.SNSSAI). And the SNSSAI identifies the S-NSSAI.

d) NetworkSlice 6.3.1.z.y Average e2e downlink delay fir a network slice a) DelayE2EDlNss.

b) This KPI describes the average e2e DL packet delay between the PSA UPF and the UE for a network slice. It is the average packet delay from the time when an GTP PDU has been sent by the PSA UPF until the time when the corresponding RLC SDU was received by the UE. The KPI type is MEAN in units of 0.1 ms.

c) This KPI is the weighted average of DL packet delay between the PSA UPF and UE for all N3 interfaces (modelled by EP-N3 MOI) and N9 interfaces (modelled by EP_N9 MOI) of all PSA UPFs supporting the network slice (modelled by NetworkSlice MOI) identified by the S-NSSAI.

This KPI is calculated in the following formula:

$$DelayE2EDlNss =$$

$$DelayE2EDlNss = \frac{\sum_{EP\_N_9}(U \cdot SNSSAI * WeightN9Dl)}{\sum_{EP\_N_3} WeightN3Dl + \sum_{EP\_N_9} WeightN9Dl}$$

Where the WeightN3Dl could be one of the following measurements (subcounters) per S-NSSAI:

Number of octets of outgoing GTP data packets on the N3 interface from UPF to (R)AN (GTP.OutDataOctN3UPF.SNSSAI); or Number of outgoing GTP data packets on the N3 interface from UPF to (R)AN (GTP.OutDataPktN3UPF.SNSSAI).

Where the WeightN9Dl could be one of the following measurements (subcounters) per S-NSSAI:

Number of octets of outgoing GTP data packets on the N9 interface for the PSA UPF (GTP.OutDataOcTN9PsaUpf.SNSSAI); or Number of outgoing GTP data packets on the N9 interface for the PSA UPF (GTP.OutDataPktN9PsaUpf.SNSSAI).

And the SNSSAI identifies the S-NSSAI.

d) NetworkSlice

3. Performance measurements 5.4.4.x GTP Data Packets and volume on N9 interface 5.4.4.x.1 Number of incoming GTP data packets on the N9 interface for the PSA UPF a) This measurement provides the number of GTP data PDUs received on the N9 interface by the PSA UPF. This measurement is split into subcounters per S-NSSAI.

b) CC c) Reception by the PSA UPF of a GTP-U data PDU on the N9 interface from the I-UPF.

d) Each measurement is an integer value.

e) GTP.InDataPktN9PsaUpf, and GTP.InDataPktN9PsaUpf.SNSSAI, where SNSSAI identifies the S-NSSAI.

f) EP_N-9 g) Valid for packet switching.

h) 5GS 5.4.4.x.2 Number of outgoing GTP data packets of on the N9 interface for the PSA UPF.

a) This measurement provides the number of GTP data PDUs sent on the N9 interface by the PSA UPF. This measurement is split into subcounters per S-NSSAI.

b) CC c) Transmission by the PSA UPF of a GTP-U data PDU of on the N9 interface to the I-UPF.

d) Each measurement is an integer value.

e) GTP.OutDataPktN9PsaUpf, and GTP.OutDataPktN9PsaUpf.SNSSAI, where SNSSAI identifies the S-NSSAI f) EP_N9 g) Valid for packet switching.

h) 5GS 5.4.4.x.3 Number of octets of incoming GTP data packets on the N9 interface for the PSA UPF a) This measurement provides the number of octets of GTP data PDUs received on the N9 interface by the PSA UPF. This measurement is split into subcounters per S-NSSAI.

b) CC c) Reception by the PSA UPF of a GTP-U data PDU on the N9 interface from the I-UPF.

d) Each measurement is an integer value.

e) GTP.InDataOctN9PsaUpf, and GTP.InDataOctN9PsaUpf.SNSSAI, where SNSSAI identifies the S-NSSAI.

f) EP_N9 g) Valid for packet switching h) 5GS 5.4.4.x.4 Number of octets of outgoing GTP data packets on the N9 interface for the PSA UPF a) This measurement provides the number of octets of outgoing GIP data PDUs sent on the N9 interface by the PSA UPF. This measurement is split into subcounters per S-NSSAI.

b) CC c) Transmission by the PSA UPF of a GTP-U data PDU of on the N9 interface to the I-UP.

d) Each measurement is an integer value.

e) GTP.OutDataOctN9PsaUpf and GTP.OutDataOctN9PsaUpf.SNSSAI, where SNSSAI identifies the S-NSSAI.

EP_N9 g) Valid for packet switching h) 5GS

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

in this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject mailer lies in less than all features of a single disclosed embodiment. Thus, the following claims are hereby incorporated into the Detailed Description, with each claim standing on its own as a separate embodiment.

What is claimed is:

1. An apparatus configured to operate as a service producer for key performance indicators (KPIs) in a fifth generation (5G) system, the apparatus comprising:
processing circuitry configured to:
collect next generation radio access network (NG-RAN) performance measurements of at least one NG-RAN or 5G core network (5GC) from at least one service producer for measurements, the NG-RAN performance measurements including packet delays for the at least one NG-RAN that include delays associated with a 5G NodeB (gNB) distributed unit (gNB DU) and delays associated with a gNB central unit (CU) user plane (UP) (gNB-CU-UP) of the at least one NG-RAN, the 5GC performance measurements including end-to-end (e2e) packet delay between a Packet Data Unit Session Anchor User Plane Function (PSA UPF) and user equipment (UE); and
generate KPIs for at least one of a sub-network, a network slice subnet, or a network slice based on at least one of the NG-RAN performance measurements or the 5GC performance measurements, the KPIs including integrated delays, gNB DU delays, and e2e delays, the integrated delays dependent on: a delay in a new radio (NR) cell DU, a delay between the NR cell DU and a user equipment (UE) connected to the NR cell DU, a delay between the NR cell DU and the gNB-CU-UP, and a delay in the gNB-CU-UP, network resources of the 5G system adjusted to improve the KPIs based on at least one of the NG-RAN performance measurements or the 5GC performance measurements; and
a memory configured to store the NG-RAN performance measurements.

2. The apparatus of claim 1, wherein the integrated packet delays are integrated for a plurality of NG-RANs contained by or associated to at least one of a sub-network, a network slice subnet, or a network slice.

3. The apparatus of claim 2, wherein the integrated delays comprise average uplink (UL) and downlink (DL) delays of NR cell DUs in gNB DUs and gNB-CU-UPs contained by or associated to at least one of the sub-network, network slice subnet, or network slice.

4. The apparatus of claim 3, wherein:
the average UL and DL delays each comprise an overall DU delay and an overall gNB CU delay,
the overall DU delay comprises an air interface delay of an air interface between the NR cell DU and the UE and a NR cell DU delay within the NR cell DU, and
the overall gNB CU delay comprises an F1 delay on an F1 interface and a gNB CU delay within the gNB-CU-UP.

5. The apparatus of claim 4, wherein the KPIs of the integrated delays are split into per Quality of Service (QoS) level and per Single Network Slice Selection Assistance Information (S-NSSAI).

6. The apparatus of claim 4, wherein the KPIs of the integrated delays are based on weighting of the overall NR cell DU delay and the overall gNB CU delay using a first weight for the overall NR cell DU delay and a second weight for the overall gNB CU delay, the weighting of the overall NR cell DU delay and the overall gNB CU delay for UL and DL packets being independent, the weighting of the overall NR cell DU delay and the overall gNB CU delay for each NR cell DU and gNB-CU-UP being independent.

7. The apparatus of claim 6, wherein:
the first weight comprises at least one of:
user plane data volume of a NR cell in the gNB DU,
user plane Packet Data Convergence Protocol (PDCP) data volume of the NR cell in a gNB CU,
number of user plane PDCP packets of the NR cell in the gNB CU,
number of user plane radio link control (RLC) packets of the NR cell in the gNB DU, or
number of user plane transport blocks (TBs) of the NR cell in the gNB DU, and
the second weight comprises at least one of:
user plane data volume of the gNB-CU-UP, or
number of user plane PDCP packets of the gNB-CU-UP.

8. The apparatus of claim 2, wherein the at least one service producer is implemented within at least one of the plurality of NG-RANs or 5GCs and within a management system separate from the plurality of NG-RANs and 5GCs.

9. The apparatus of claim 1, wherein the KPIs of the gNB DU delays include average uplink (UL) and downlink (DL) delays of NR cell DUs in a gNB DU, each of average UL and DL delays comprise an overall DU delay that includes an air interface delay of an air interface between the NR cell DU and the UE and a NR cell DU delay within the NR cell DU.

10. The apparatus of claim 9, wherein the KPIs of the gNB DU delays are split into per Quality of Service (QoS) level and per Single Network Slice Selection Assistance Information (S-NSSAI).

11. The apparatus of claim 9, wherein the KPIs of the gNB DU delays are based on weighting of the overall NR cell DU delay using independent weights for UL and DL packets, the weights of the overall NR cell DU delay for each NR cell DU being independent.

12. The apparatus of claim 1, wherein:
the KPIs of the e2e delays include average uplink (UL) and downlink (DL) e2e packet delays between a user plane function (UPF) and the UE, and
the KPIs of the e2e delays are based on weighting of transmissions over N3 and N9 interfaces using independent weights for UL and DL packets and for the N3 and N9 interfaces.

13. The apparatus of claim 12, wherein:
an N3 weight comprises at least one of:
number of octets of incoming or outgoing General Packet Radio Service (GPRS) Tunneling Protocol (GTP) data packets on the N3 interface, and
number of incoming or outgoing GTP data packets on the N3 interface, and
an N9 weight comprises at least one of:
number of octets of incoming or outgoing GTP data packets on the N9 interface, and
number of incoming or outgoing GTP data packets on the N9 interface.

14. A management system configured provide key performance indicators (KPIs) in a fifth generation (5G) system, the system comprising:
a service producer for KPIs for at least one of a sub-network, network slice subnet, or network slice comprising processing circuitry and memory configured to:
collect, from a plurality of service producers, performance measurements of at least one of next generation radio access networks (NG-RANs) or 5G core network (5GC) contained by or associated to at least one of a sub-network, network slice subnet, or network slice, the performance measurements including packet delays that include uplink (UL) and downlink (DL) delays associated with each new radio (NR) cell distributed unit (NR cell DU) and delays associated with a $5^{th}$ generation NodeB (gNB) central unit (CU) user plane (UP) (gNB-CU-UP) of each of the NG-RANs, or delays associated with each user plane function (UPF); and
generate KPIs based on the performance measurements collected by the service producer for KPIs, the KPIs including at least one of integrated average UL and DL packet delays, gNB DU delays or end-to-end (e2e) delays for the at least one of the sub-network, network slice subnet, or network slice that are dependent on:
an overall DU delay that comprises an air interface delay of an air interface between the NR cell DU and a user equipment (UE) connected to the NR cell DU and a NR cell DU delay within the NR cell DU, and an overall gNB CU delay that comprises an F1 delay on an F1 interface and a gNB CU delay within the gNB-CU-UP, or
an e2e packet delay between the UPF and the UE,
wherein the KPIs further include average UL and average DL packet delays of NR cell DUs in a gNB DU, each of average UL and DL delays comprise an overall NR cell DU delay, and the KPIs are based on weighting of the overall NR cell DU delay using independent weights for UL and DL packets, the weights for each NR cell DU being independent.

15. The system of claim 14, wherein the KPIs are based on weighting of the overall NR cell DU delay, and the overall gNB CU delay, or e2e delay using independent weights for each overall NR cell DU delay, and for each overall gNB CU delay, or for each e2e packet delay and for UL and DL packets.

16. The system of claim 15, wherein:
each weight for one of the NR cell DU delays of an NR cell in each gNB DU or gNB CU comprises at least one of:
user plane data volume of the NR cell in the gNB DU,
user plane Packet Data Convergence Protocol (PDCP) data volume of the NR cell in a gNB CU,
number of user plane PDCP packets of the NR cell in the gNB CU,
number of user plane radio link control (RLC) packets of the NR cell in the gNB DU, or
number of user plane transport blocks (TBs) of the NR cell in the gNB DU, each weight for one of the overall gNB CU delays comprises at least one of:
user plane data volume of the gNB-CU-UP, or
number of user plane PDCP packets of the gNB-CU-UP, and each weight for one of the e2e delays comprises at least one of:
number of octets of incoming or outgoing general packet radio service (GPRS) Tunnelling Protocol (GTP) data packets on an N3 interface,
number of incoming or outgoing GTP data packets on the N3 interface,
number of octets of incoming or outgoing GTP data packets on an N9 interface, or
number of incoming or outgoing GTP data packets on the N9 interface.

17. A non-transitory computer-readable storage medium that stores instructions for execution by one or more processors of a service producer for key performance indicators (KPIs) in a fifth generation (5G) system, the one or more processors to configure the service to, when the instructions are executed:
collect performance measurements of next generation radio access networks (NG-RANs) and a 5G core network (5GC) contained by or associated to at least one of a sub-network, network slice subnet, or network slice from a plurality of service producers, the performance measurements including packet delays for each gNB of each of the NG-RANs and packet delays for each 5GC, the packet delays for each gNB including uplink (UL) and downlink (DL) delays associated with a NR cell distributed unit (NR cell DU) and delays associated with a $5^{th}$ generation NodeB (gNB) central unit (CU) user plane (UP) (gNB-CU-UP), and the packet delays for 5GC associated with a user plane function (UPF); and
generate KPIs for the at least one of a sub-network, network slice subnet, or network slice based on the performance measurements of at least one of the NG-RANs or 5GC, the KPIs including at least one of integrated average UL and DL packet delays in the NG-RANs, gNB DU delays, or end-to-end (e2e) delays, the integrated average UL and DL packet delays dependent on:
an overall gNB DU delay that comprises an air interface delay of an air interface between the NR cell DU and a user equipment (UE) connected to the NR cell DU and a NR cell DU delay within the NR cell DU, and an overall gNB CU delay that comprises an F1 delay on an F1 interface and a gNB CU delay within the gNB-CU-UP, wherein:

the KPIs of integrated packet delays in the at least one of the NG-RANs are based on weighting of an overall NR Cell DU delay and the overall gNB CU delay using a first weight for the overall NR Cell DU delay and a second weight for the overall gNB CU delay, the weighting of the overall NR Cell DU delay and the overall gNB CU delay for UL and DL packets are independent, the first weight comprises at least one of:
user plane data volume of a NR cell in a gNB DU,
user plane Packet Data Convergence Protocol (PDCP) data volume of a NR cell in a gNB CU
number of user plane PDCP packets of the NR cell in the gNB CU,
number of user plane radio link control (RLC) packets of the NR cell in the gNB DU, or
number of user plane transport blocks (TBs) of the NR cell in the gNB DU, the second weight comprises at least one of:
user plane data volume of the gNB-CU-UP, or
number of user plane PDCP packets of the gNB-CU-UP, the KPIs of e2e packet delays in NG-RAN are based on weighting of transmissions over N3 and N9 interfaces using independent weights for UL and DL packets and for the N3 and N9 interfaces, an N3 weight comprises at least one of:
number of octets of incoming or outgoing general packet radio service (GPRS) Tunnelling Protocol (GTP) data packets on the N3 interface, or
number of incoming or outgoing GTP data packets on the N3 interface, and an N9 weight comprises at least one of:
number of octets of incoming or outgoing GTP data packets on the N9 interface, or
number of incoming or outgoing GTP data packets on the N9 interface.

18. The medium of claim 17, wherein:

the KPIs of the gNB DU delays include average UL and DL packet delays for at least one gNB DU in or associated with at least one of the sub-network, network slice subnet or network slice that are dependent on an overall gNB DU delay for each of the NR cell DUs in the at least one gNB DU in or associated with at least one of the sub-network, network slice subnet or network slice, and the overall gNB DU delay comprises, for each NR cell DU, another air interface delay of an air interface between the NR cell DU and a UE connected to the NR cell DU and another NR cell DU delay within the NR cell DU.

* * * * *